Nov. 13, 1962 G. T. SORENSON 3,063,261
FLEXIBLE COUPLING FOR SHAFTS
Filed May 15, 1961

3,063,261
FLEXIBLE COUPLING FOR SHAFTS
Gerald T. Sorenson, Wauwatosa, Wis., assignor to Chain Belt Company, Milwaukee, Wis., a corporation of Wisconsin
Filed May 15, 1961, Ser. No. 109,915
4 Claims. (Cl. 64—11)

This invention relates to flexible couplings for shafts and particularly to the flexible element which allows some misalignment or angularity of the shafts.

The coupling of the present invention comprises two pulleys or sheaves normally used with V-belts and a coupling element which is clamped thereover. According to the invention the element is discontinuous or segmental and has a gap between the cofacing ends which allows the element to be wrapped tightly on the pulleys in clamping and to be self-tightening in operation at least to the extent that periodic retightening is not required. The clamp and the two sides of the pulley groove are in a triangular relationship and the rib is secured therebetween.

The coupling element is of molded rubber with fabric reinforcement and preferably includes overhanging flaps which may be molded integrally therewith. Such flaps form a protective cover for the two clamping rings or straps applied over the two spaced wedge-shaped, inwardly extending ribs fitting the V-grooves of the pulleys.

The flexible bridge integrally connecting the two ribs of the element is molded with the reinforcement fabric having its weave set at 45° with respect to the coupling axis so that the cords of the fabric in either one or the other direction are directly placed in tension by the torque transmitted through the coupling.

The drawings furnished herewith illustrate the best mode of carrying out the invention as persently contemplated and set forth hereinafter.

Figure 1:
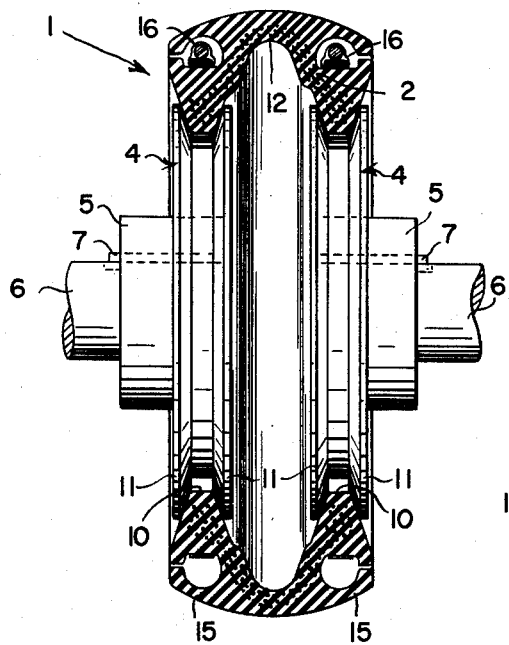
FIGURE 1 is a cross-section of the coupling which joins the ends of the two shafts and the pulleys shown in elevation.
Figure 3:
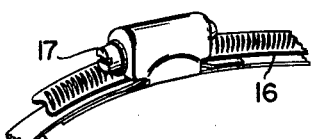
FIG. 3 is an enlarged view of the overlapping ends of one of the clamps securing the ribs of the element in the respective grooves of the pulleys.
Figure 2:
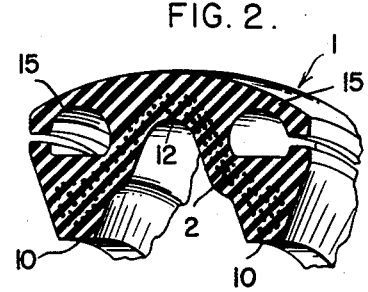
FIG. 2 is an enlarged perspective view of a portion of the coupling element.
Figure 4:
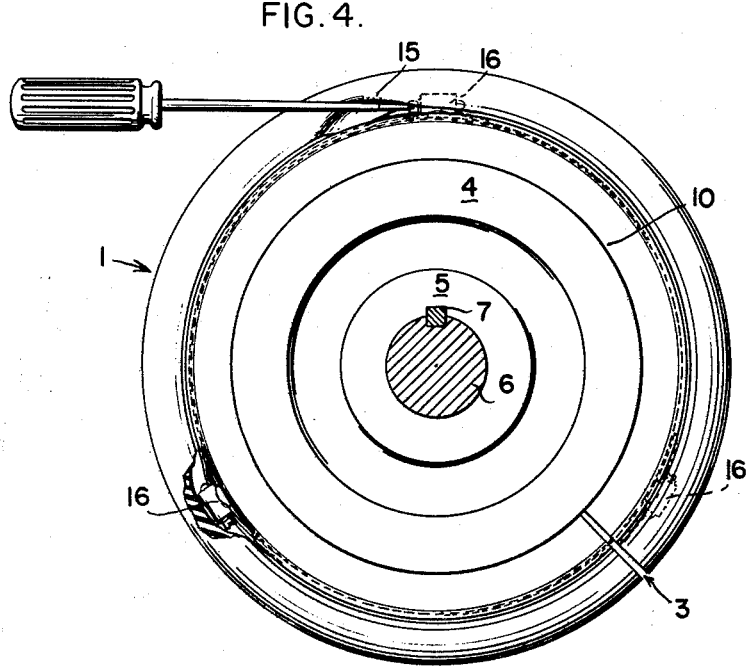
FIG. 4 is an end elevation of the coupling shown in FIGURE 1 and shows the manner of inserting a screwdriver into the groove to tighten or loosen one of the clamps.
Figure 5:
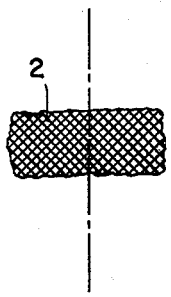
FIG. 5 is an illustration of the weave of the reinforcing fabric which is embedded in the element. The axis of rotation of the coupling, not shown, is represented by the broken line.

The element 1 shown in the drawings is of rubber or other similar material and is molded with the fabric 2 embedded therein. Element 1 may be molded as a segment of a circle, but is more readily molded first as a complete or closed ring and then cut to provide the gap as at 3 between the ends of the element as shown in FIG. 4.

The cross-section of element 1 is symmetrical respecting a plane normal to the axis of the coupling and midway between the ends of the coupling. The ends of the coupling referred to include the pulleys 4 having hubs 5 which are mounted on the ends of shafts 6 and secured thereto as by the keys 7 set in the corresponding keyways of the shaft and hub.

The two parallel ribs 10 of element 1 have convergent sides or faces so as to fit in the V-shaped grooves formed by the corresponding peripheral flanges 11 of pulleys 4. The two ribs 10 are joined by the arched flexible bridge 12 and the fabric 2 is disposed centrally therein as will be further described.

The flaps 15 project axially of the coupling and form annular recesses or grooves in which the clamps 16 are disposed to extend around the element over each rib 10. Each clamp 16 as shown comprises a number of hose-type clamps assembled in a series so that the adjustment screws 17 are spaced approximately equally.

Flaps 15 may be formed integrally with element 1 or may be separately formed and bonded to the element. The flaps are to provide an unbroken outer periphery which minimizes the danger of injury in case of accidental contact with the coupling while it is rotating.

Element 1 is readily opened or expanded for assembly on pulleys 4 and the clamps 16 are then pushed under flaps 15 and tightened.

Each clamp 16 is tightened as with screwdriver 19 or whatever tool is required by pushing aside the flap 15 for access to the adjustment screw 17. Screws 17 should be tightened progressively so that the shortening of the clamps and the compressive effect on element 1 is distributed around the periphery of the coupling and each rib 10 is well seated in the groove of the corresponding pulley 4.

Element 1 should be of such size that gap 3 between the ends of the element is sufficient to allow the element to be contracted by the clamps until the ribs 10 are well secured between flanges 11 of pulleys 4. This gap should generally be at least one-quarter of an inch for a coupling, for example, comprising two five-inch pulleys and some gap should remain after tightening.

The cords of fabric 2 are embedded in element 1 so as to be diagonal with respect to the axis of the coupling and so that the torque or twist applied to the element exerts a more or less direct pull on all of the cords extending in one direction. The same twist and the pull resulting therefrom tends to draw the arched bridge 12 inwardly or toward the coupling axis and prevents the material from cracking open as it is flexed by reason of the angularity or misalignment of shafts 6 within the operating limits of the coupling.

The fabric 2 includes several plies in bridge 12 and extends into each rib 10 where additional plies are provided for added reinforcement and anchoring of the ends of the cords referred to. However, the torque transmitted through element 1 does not tend to pull ribs 10 out of the grooves of pulleys 4 against clamps 16. Operation of the coupling does not require any additional tightening of the clamps. That is, the moderate initial tightening provided is all that is required to frictionally secure the ribs in the grooves of the pulleys.

Although element 1 is molded with a given diameter, the element may be easily shortened to fit pulleys of a somewhat smaller diameter if space limitations require or the pulleys of the given diameter are not available. Also parts of several elements may be combined to fit pulleys of a larger diameter if a higher capacity is required of the coupling.

Various embodiments of the invention may be employed within the scope of the accompanying claims.

I claim:

1. A flexible coupling for operatively connecting the ends of two shafts, comprising a pair of V-belt type pulleys adapted to be mounted on the ends of the shafts a given distance apart, an arcuate, flexible element including parallel, inwardly projecting ribs having inwardly converging sides fitting the sides of the pulleys forming the grooves, each rib having a cylindrical surface facing outwardly respecting the coupling axis and a clamp ring engaging said surface and securing the rib in the groove of the corresponding pulley, and an arched, central flexible bridge having a width equal to said distance and conjoining said ribs between the clamps and adjacent side of the pulleys, the torque applied to one shaft being transmitted through said element to said other shaft, said element having cofacing ends with a space therebetween which is sufficient to allow the element to be tightened on the pulleys of each clamp ring extending thereover.

2. In a coupling, a pair of V-groove pulleys, a flexible arcuate element for clamping on said V-groove pulleys as when fixed on the aligned ends of two shafts to form a coupling therefor, said element having spaced parallel ribs fitting within the V-grooves and a flexible, arched bridge joining the two ribs, said bridge and ribs having a fabric reinforcement embedded therein and extending from rib to rib, each rib having an overhanging flap extending from the bridge, and circular clamp means beneath each flap and extending around each rib to secure the same in the corresponding groove, said arcuate element being discontinuous and said clamp means extending over the gap between the spaced cofacing ends of the ribs.

3. A flexible coupling element for joining the aligned ends of two shafts having V-belt pulleys mounted thereon including parallel ribs to fit and engage the pulleys and a flexible arched bridge connecting the ribs, each rib having an upper clamping surface and sides fitting the V-groove of the pulley, said ribs and said bridge being formed integrally and having an internal fabric reinforcement comprising cords overlying the coupling axis at an angle of 45° and having protective flaps extending over said clamping surfaces.

4. A flexible coupling element for joining adjacent V-grooved pulleys mounted on the aligned ends of two shafts a given distance apart, said element comprising an arcuate, flexible molding including parallel, inwardly projecting ribs having inwardly converging sides for fitting the sides of the pulleys forming the grooves, each rib having a cylindrical surface facing outwardly respecting the coupling axis for a clamp ring to engage said surface and secure the rib in the groove of the corresponding pulley, and an arched, central flexible bridge having a width equal to said distance and conjoining said ribs near said surfaces whereby the torque applied to one rib is transmitted through said bridge to said other rib, said element having cofacing ends with a space therebetween which is sufficient to allow the element to be tightened on the pulleys by each clamp ring extending thereover.

References Cited in the file of this patent

UNITED STATES PATENTS 2,648,958     Schlotmann _____ Aug. 18, 1953

FOREIGN PATENTS 893,876     Germany _____ Oct. 19, 1953